S. C. TAYLOR.
PRUNING SHEARS.
APPLICATION FILED AUG. 5, 1909.
973,996.
Patented Oct. 25, 1910.
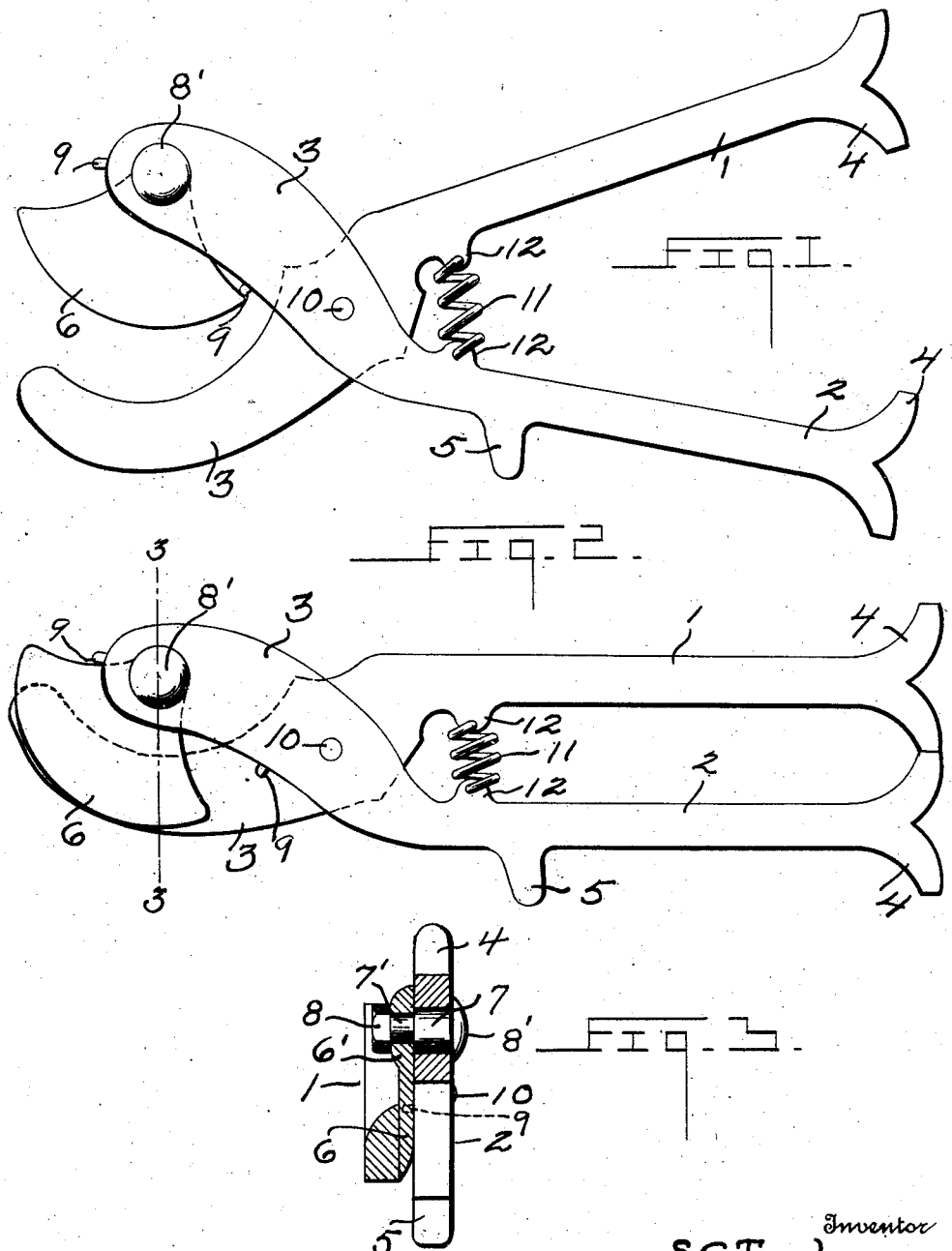
Witnesses
E. E. Johansen
M. L. Low
Inventor
S. C. Taylor.
By Woodward & Chandlee
Attorney

UNITED STATES PATENT OFFICE.

SAMUEL C. TAYLOR, OF LEAGUE CITY, TEXAS.

PRUNING-SHEARS.

973,996.  Specification of Letters Patent.  Patented Oct. 25, 1910.

Application filed August 5, 1909. Serial No. 511,328.

*To all whom it may concern:*

Be it known that I, SAMUEL C. TAYLOR, a subject of the King of England, residing at League City, in the county of Galveston and State of Texas, have invented certain new and useful Improvements in Pruning-Shears, of which the following is a specification.

This invention relates to new and useful improvements in shears, and more particularly to pruning shears such as are used in trimming trees, hedge bushes and other horticultural products.

The primary object of my invention is to provide a simply constructed device of this character, by means of which the shears may be rapidly operated to effectively and neatly perform the cutting operation.

Another object is to provide suitable cutting blades, which are so disposed relatively to each other, that a partial draw cut may be obtained upon the operation of the shears, with a minimum strain upon the muscles of the hand of the operator.

A further object is to provide a pruning shears, one of the blades of which is pivotally mounted on the end of the operating handle, and is adapted to rotate upon the movement of said handle, suitable stops being provided to limit such rotative movement.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 is a side elevation of my improved pruning shears. Fig. 2 is a similar view, the shears being shown in closed position. Fig. 3 is a detail vertical section taken on the line 3—3 of Fig. 2.

Referring to the drawings, there are shown the two pivoted operating handles 1 and 2 having their outer ends reversely curved, as shown at 3. It will be noted that the curvature of the handle 1 is considerably greater than that of the handle 2. Each of the handles have their lower ends split and curved in opposite directions, as shown at 4, to provide means to prevent the hand of the operator from slipping from the handles during the manipulation of the shears. The handle 2 also has a vertical projection 5 integrally formed therewith to form a finger rest and thus further facilitate the easy operation of the shears.

Pivoted upon the extremity of the handle 2, there is a sector cutting blade 6, which extends toward the member 3, and which swings upon its pivot longitudinally of the shears. The pivot bolt 7 which supports the blade 6 upon the end of the handle 2, is formed with a reduced portion 7', which extends through the enlarged portion 6' of the blade, and upon which said blade is adapted to have rotative movement. A nut 8 has threaded engagement with the reduced end of the pivot bolt, the other end thereof being formed with a suitable head 8', whereby any transverse movement of the bolt is prevented. Upon the edge of the member 2, suitable stops 9 are formed, and are adapted to limit the swinging movement of the sector blade 6. These stops are so located, as to prevent the blade 6 from moving out of operative position.

It will be noted that the handle members 1 and 2 are pivotally disposed upon each other and connected by the transverse pin 10, this pin being located at the lower end of the curved portions 3 of the operating handles. A spiral spring 11 is disposed between the handles 1 and 2 and has its ends secured to the integrally formed studs 12, which are oppositely disposed upon the handles. This spring is normally adapted to retain the handles in open position, the sector blade 6 being entirely out of engagement with the curved end 3 of the handle 1, and held in such position by means of the rear stop 9 formed upon the edge of the other of the handle members.

In devices of this kind it has been found necessary to allow the opposite cutting edges to converge inwardly, and frequently when engaged with a branch, the branch will slip outwardly on account of the angle at which the cutting edges converge. This is largely induced by the relative longitudinal movement between the two cutting edges at which some slipping action is forced to occur by reason of the draw cut effect produced. This fault is largely overcome in the present invention, as will be now indicated.

In operation, the parts being in the position shown in Fig. 1, the operator firmly grasps the handles 1 and 2, placing his forefinger in advance of the projection 5. He then presents the shears to the material to be cut and compresses the handle members against the expansive tendency of the spring 11. It will be seen that when the material to be cut engages the blade 6 upon presentation of the shears thereagainst, the blade will be forced inwardly against the stop 9, its inner edge portion thus being swung away from the cutting edge 3' of the member 1 at its inner portion. Upon the initial movement of the handle in the cutting action, it will be seen that there will be no slipping engagement of the cutting edges upon the material by reason of the fact that the blade 6 is freely pivoted and may move outwardly a limited distance. After a short movement of the opposite members of the shears, however, the pin 9 engages the blade 6 upon its outer side, and holds it in rigid relation with the portion 3 of the handle 2, by which its cutting edge is moved slightly longitudinally in engagement with the material being cut, thus effecting a draw cut in the final and most difficult portion of the operation of the device.

From the foregoing it will be seen that I have provided a very simply constructed, and efficient pruning shears, one of the blades of which has independent movement which is adapted to be held initially against longitudinal cutting action by the material engaged, and thus more easily and efficiently perform the functions for which my improved shears are designed.

The various parts of my improved shears may be readily assembled, and being of extremely simple construction, the device may be very inexpensively manufactured.

What is claimed is:

In a pair of shears, the combination with two pivoted cross members, of a sectoral blade pivoted at its minor end to the forward portion of one of the members for movement longitudinally of the said member, and a pair of stops carried by the said member at opposite sides of the pivot point of the blade, said stops being located in the path of movement of the blade to limit the movement thereof in both directions, said sectoral blade extending toward the forward portion of the other member and being arranged for movement thereover when the forward portions of the two members are brought toward each other.

In testimony whereof I affix my signature, in presence of two witnesses.

SAMUEL C. TAYLOR.

Witnesses:
  I. D. SINGELTARY,
  J. R. MOBERLY.